United States Patent Office 2,917,558
Patented Dec. 15, 1959

2,917,558

MANUFACTURE OF CHLOROFLUORO PROPENES

William J. Cunningham, Rockaway, and Cyril Woolf, Morristown, N.J., assignors to Allied Chemical Corporation, a corporation of New York No Drawing. Application December 13, 1957
Serial No. 702,532

3 Claims. (Cl. 260—653.4)

This invention is directed primarily to manufacture of 2-chloropentafluoropropene, $CF_3CCl:CF_2$, a known, clear, colorless liquid boiling at 6.8° C., and useful e.g. as a fumigant.

It has been proposed to make $CF_3CCl:CF_2$ by zinc dechlorination of $CF_2ClCCl_2CF_2Cl$ to form $$CF_2ClCCl:CF_2$$

followed by $SbF_3$ treatment of the latter in a high pressure autoclave to produce $CF_3CCl:CF_2$. The disadvantages of this round-about procedure are apparent. The zinc cannot be re-used, and hence is a high cost item. As to fluorinating processes in general utilizing the antimony salts, operating procedures are subject to recognized disadvantages among which are corrosiveness of the antimony halide, difficulty of operation involved by reason of the use of liquid reactants, as distinguished from gasphase procedures, and the relatively high volatility of antimony halides thereby giving rise to formation of products which contain small amounts of the fluorinating agent as impurity which is not easily removed. More particularly, with respect to use of $SbF_3$ as a fluorine donating reactant, if a relatively small amount is used, fluorination is difficult and time-consuming, and if a large amount is employed, saturation of double bonds takes place resulting in the production of unwanted high boilers.

A major object of the present invention lies in the provision of a solid catalyst, gas-phase method for making $CF_3CCl:CF_2$, and $CF_3CCl:CClF$ if desired, by HF fluorination of a certain chlorofluoropropene starting material.

In accordance with the invention, it has been found that $CF_3CCl:CCl_2$ is so constituted, with respect to physical and chemical properties, as to render this compound a particularly suitable organic starting material for production of $CF_3CCl:CF_2$, and of $CF_3CCl:CClF$ if desired, by catalytic gas-phase operation. Further, it has been found that certain aluminum fluoride catalyst possesses the properties of effectively promoting reaction of anhydrous HF and $CF_3CCl:CCl_2$ and effecting unexpected fluorine replacement of two chlorine atoms on a doubly bound carbon atom. Hence, the invention comprises the discovery or selection of a certain organic starting material, and the conjunctive relation of the same with the hereindescribed aluminum fluoride catalysts and certain reaction conditions, which interrelated factors result in provision of an easily controllable, all gas-phase truly catalytic procedure, in accordance with which the desired $CF_3CCl:CF_2$ may be made in acceptable yields. A further factor of importance is that, notwithstanding the activity for promoting substitution, the described aluminum fluorides show no discernible tendency to promote reaction which would form saturated end products.

Many different types of aluminum fluorides are known. In general these materials are composed of $AlF_3$ crystals of relatively large size, i.e. not less than 1000 and usually several thousand Angstrom units radius and above, as in the case of commercial types of $AlF_3$ available on the market. The aluminum fluoride catalysts utilized in accordance with the present invention are of non-crystalline or "amorphous" structure, and when examined by X-ray diffraction technique show extremely small or sub-microscopic crystals designated as "crystallites." These aluminum fluorides are of crystallite size not greater than about 500 Angstrom units radius and are derived by reaction of aluminum chloride and HF. As crystallite size decreases, catalytic activity increases, and the preferred aluminum fluorides are those having crystallite size of about 200 A. and below, as determined by X-ray diffraction technique. Catalytic aluminum fluorides of this type are more fully discussed in U.S.P. 2,676,996 of April 27, 1954, which discloses processes for making the same by procedures involving reaction of aluminum chloride and HF.

Practice of the invention involved subjecting gas-phase $CF_3CCl:CCl_2$ (B.P. 88° C.) starting material to the action of gaseous anhydrous hydrogen fluoride in the presence of the herein aluminum fluoride catalysts in a suitable reaction zone at the elevated fluorination temperatures, and recovering from the reaction zone exit the sought-for $CF_3CCl:CF_2$ product. Reactions involved may be represented by $$CF_3CCl:CCl_2 + 2HF \rightarrow CF_3CCl:CF_2 + 2HCl$$

which also produces some $CF_3CCl:CClF$.

In all embodiments of the invention, reaction temperature should be not less than about 300° C. At such temperature, in the presence of HF and the described catalyst, appreciable fluorination is effected at reasonable contact time. Usually, reaction temperature is not below 350° C. Temperatures as high as about 450° C. may be utilized without interfering appreciably with yields or effecting excessive decomposition. Other factors being equal, higher temperatures promote higher degree of fluorination. Generally, preferred temperatures are not higher than about 425° C. to avoid incipient fragmentation, preferred temperature range being about 350–425° C.

Mol ratio of HF to organic starting material is variable to some extent and may be between 1:1 to 3:1. For production of $CF_3CCl:CF_2$ theoretical requirements of HF are two mols of HF per mol of $CF_3CCl:CCl_2$. In any case, enough anhydrous HF is employed to react with a substantial amount of the starting material to form a substantial quantity of $CF_3CCl:CF_2$. While less than theoretical quantities of HF may be employed, it is desirable to use quantities of HF which approach but do not substantially exceed stoichiometric proportions. When employing the catalysts described, if the HF to organic starting material molar ratio is increased appreciably above 2:1, utilization of HF decreases markedly with insufficient worthwhile increase of product formation. In large scale work, it is preferred to use HF in amount constituting a relatively small, e.g. 10–20 weight percent, molecular deficiency based on theory requirements.

Contact time may be varied considerably without noticeable disadvantage to high process efficiency. Increasing contact time and reactor temperature result in higher HF conversion and higher conversion of starting material to sought-for product, and lowering contact time and reactor temperature result in lower HF conversion. In general, contact time may lie in the range of 2 to 50 seconds, and preferably in the range of 10–25 seconds. To a substantial extent, contact time, reaction temperature and ratio of reactants are interrelated, and $CF_3CCl:CF_2$ production may be varied by alteration of one or more of these factors. For any given operation, optimum conditions may be determined by test runs.

In general practice, organic starting material and anhydrous HF are vaporized and metered into a tubular reactor packed with catalyst, made of suitable inert material such as nickel, and provided with external heating equipment preferably including automatic means for maintaining given temperatures in the reaction zone. Product recovery may be effected more or less conventionally as in this art. For example, reactor exit gases may be passed preliminarily into a cold water scrubber to absorb HCl, any HF present, and to condense the high boiling organics, particularly any unreacted starting material, and probably most of the $CF_3CCl:CClF$ by-product (B.P. 48–49° C.). Gaseous exit of the water scrubber may be passed thru a $CaCl_2$ drying tower and then into a Dry Ice-acetone cooled cold trap to condense $CF_3CCl:CF_2$ product (B.P. 6.8° C.). Organics and water from the water scrubber may be separated by stratification and decantation, and after drying and filtering may be combined with the cold trap condensate, and the combined condensates fractionally distilled to isolate and recover the organics. $CF_3CCl:CClF$, useful as a fumigant, may be recovered as such, but preferably such material is recycled to facilitate greater production of the primarily sought-for $CF_3CCl=CF_2$.

*Example 1.*—About 380 cc. (450 g.) of about 6 mesh size anhydrous aluminum fluoride catalyst, having crystallite size below about 200 Angstrom units and having been prepared by procedure substantially the same as in Example C of U.S.P. 2,676,996, were charged into about 30 inches of the length of a one inch I.D. nickel tube about 36 inches long and enveloped substantially throughout its length by an electric heating unit. The reactor is provided at one end with suitable inlets for reactants, and the exit end of the pipe is connected to a products recovery system. During about 6 hours, about 9.65 mols (193 g.) of gaseous anhydrous HF and about 6.86 mols (1370 g.) of vaporized $CF_3CCl:CCl_2$ were metered and fed into the reactor at approximately constant rate. Mol ratio of HF to organic starting material was about 1.4:1. Throughout the run internal temperature in the reactor was maintained at about 400° C., and contact time was about 11 seconds. Exit gases of the reactor were passed into a water scrubber in which HCl and any HF were absorbed, and organic materials discharged from the reactor were partially condensed. Low boiling organics not condensed in the water scrubber were dried in a $CaCl_2$ tower, and then totally condensed in a Dry Ice-acetone cooled trap. The organic layer formed in the water scrubber, after separation from aqueous liquor by decantation, drying and filtering, was combined with the condensate formed in the cold trap. The combined condensates (1205 g.) were fractionally distilled. 0.97 mol of

$CF_3CCl:CF_2$ identified by infrared analysis, was recovered as a fraction boiling substantially in the range of 6–7° C. 0.95 mol of $CF_3CCl:CClF$ (B.P. 48–49° C.) and 3.89 mols of unreacted starting material $CF_3CCl:CCl_2$ (B.P. 88° C.) were recovered. Titration showed 3.1 mols of HCl had been formed. 11.7 mol percent of the starting material was converted to $CF_3CCl:CF_2$ and 13.9 mol percent of the starting material was converted to $CF_3CCl:CClF$. Recovery of the organic material fed was 83%. On the basis of the weight of organic starting material reacted, consumed, and converted to other organic products, yield of $CF_3CCl:CF_2$ was about 27 mol percent.

*Example 2.*—In this run the same catalyst and reactor were employed as in Example 1. During about 5 hours, about 5.25 mols (105 g.) of gaseous anhydrous HF and about 2.33 mols (456 g.) of $CF_3CCl:CCl_2$ were metered and fed into the reactor at a substantially constant rate. Mol ratio of HF to organic starting material was about 1.8:1. Temperature was maintained throughout the run at about 375° C. and contact time was about 20 seconds. The reactor exit was handled as in Example 1. Dried organic from the water scrubber was combined with the cold trap condensate. Fractional distillation of the combined condensates (371 g.) resulted in recovery of 0.31 mol of $CF_3CCl:CF_2$. On further distillation, 0.37 mol of $CF_3CCl:CClF$, and 1.26 mols of unreacted starting material were recovered. About 13.3 mol percent of the organic starting material was converted to $CF_3CCl:CF_2$, and about 15.9 mol percent of the starting material was converted to $CF_3CCl:CClF$. Total organic recovery was about 83.5% of the organic materials fed. On the basis of the weight of organic starting material reacted, consumed and converted to other organic products, yield of $CF_3CCl:CF_2$ was about 29 mol percent.

We claim:

1. The process which comprises subjecting gas-phase $CF_3CCl:CCl_2$ starting material, at temperatures substantially in the range of 300–450° C. and while in the presence of anhydrous aluminum fluoride catalyst, to the action of anhydrous HF in quantity and for a time sufficient to fluorinate a substantial amount of said starting material and to form a substantial amount of $CF_3CCl:CF_2$

said catalyst having crystallite size not substantially greater than 500 Angstrom units radius and having been derived by reaction of aluminum chloride and HF, and recovering from the resulting reaction products material of the group consisting of $CF_3CCl:CF_2$ and $CF_3CCl:CClF$.

2. The process of claim 1 in which temperature is substantially in the range of 350–425° C.

3. The process of claim 1 in which temperature is substantially in the range of 350–425° C., and hydrogen fluoride is present in amount constituting a relatively small molecular deficiency on the basis of the said $CF_3CCl:CCl_2$ starting material.

References Cited in the file of this patent

UNITED STATES PATENTS 2,670,388  Miller et al. _____ Feb. 23, 1954